(12) United States Patent
Martini et al.

(10) Patent No.: US 7,697,439 B2
(45) Date of Patent: Apr. 13, 2010

(54) METHOD OF DETERMINING TRANSIT COSTS ACROSS AUTONOMOUS SYSTEMS

(75) Inventors: Luca Martini, Denver, CO (US); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1128 days.

(21) Appl. No.: 11/126,486

(22) Filed: May 10, 2005

(65) Prior Publication Data

US 2006/0256724 A1 Nov. 16, 2006

(51) Int. Cl.
*H04L 12/26* (2006.01)
(52) U.S. Cl. .................................. 370/238; 370/254
(58) Field of Classification Search ............ 370/254, 370/225, 404, 401, 408, 216, 389, 256, 235, 370/238; 709/241, 232
See application file for complete search history.

(56) References Cited

U.S. PATENT DOCUMENTS

| | | | |
|---|---|---|---|
| 6,256,675 B1 * | 7/2001 | Rabinovich | 709/241 |
| 6,963,575 B1 * | 11/2005 | Sistanizadeh et al. | 370/404 |
| 7,023,808 B2 | 4/2006 | Ball et al. | |
| 2002/0078223 A1 * | 6/2002 | Baldonado et al. | 709/232 |
| 2002/0141343 A1 * | 10/2002 | Bays | 370/235 |
| 2003/0174653 A1 * | 9/2003 | Basu et al. | 370/238 |
| 2005/0068968 A1 | 3/2005 | Ovadia et al. | |
| 2005/0201302 A1 * | 9/2005 | Gaddis et al. | 370/254 |
| 2005/0232230 A1 * | 10/2005 | Nagami et al. | 370/351 |
| 2006/0126642 A1 * | 6/2006 | Kojima et al. | 370/395.52 |
| 2006/0193252 A1 * | 8/2006 | Naseh et al. | 370/225 |
| 2006/0209716 A1 * | 9/2006 | Previdi et al. | 370/254 |

OTHER PUBLICATIONS

Retana, Alvaro et al., "BGP Custom Decision Process," Network Working Group, Internet Draft, draft-retana-bgp-custom-decision-00.txt, Oct. 2002, 6 pages.
USPTO, PCT International Search Report and Written Opinion of the International Searching Authority, Sep. 6, 2006, 9pp.
Communication received in corresponding European case application No. 06758916.8—1 525 / 1886154, PCT/US2006/016800 dated Oct. 20, 2009 (6 pages).
Current claims from corresponding European case application No. 06758916.8—1525 / 1886154, PCT/US2006/016800, Nov. 2009 (6 pages).

* cited by examiner

*Primary Examiner*—Kwang B Yao
*Assistant Examiner*—Syed Bokhari
(74) *Attorney, Agent, or Firm*—Hickman Palermo Truong & Becker LLP (57) ABSTRACT

A method for determining a cumulative network layer reachability cost of traversing one or more autonomous network routing systems comprises receiving first network route information from an originating customer edge router, wherein the first network route information identifies a route in a customer network; determining a transit cost from the provider edge router to an endpoint associated with the originating customer edge router based upon a metric value received in a cost community attribute; repeating the determining step for each of one or more autonomous systems that lie in a path from the originating customer edge router to a destination customer edge router, to result in determining an accumulated transit costs across one or more autonomous systems; and determining, based at least in part upon the accumulated transit cost, a best path from the provider edge router to the endpoint associated with the originating customer edge router.

34 Claims, 7 Drawing Sheets

302 Receive network route information from an originating CE router

304 Determine transit cost from PE router to endpoint associated with originating CE router based on metric received in cost community attribute 306 Repeat for each of all autonomous systems in a path from the originating CE router to a destination CE router, resulting in an accumulated transit cost 308 Determine best path from PE router to endpoint based in part on the accumulated transit cost

Fig. 4

402 Receive network route information from an originating CE router

404 Determine cost metric for the route; store cost metric in BGP cost community attribute

406 Send route announcement message to egress PE router with route and cost community attribute 408 Determine transit cost from egress PE router to endpoint associated with originating CE router based on metric value in cost community attribute

410 Determine best path from PE router to endpoint based in part on the accumulated transit cost

METHOD OF DETERMINING TRANSIT COSTS ACROSS AUTONOMOUS SYSTEMS

FIELD OF THE INVENTION

The present invention generally relates to managing virtual private network (VPN) hosts that use Border Gateway Protocol (BGP). The invention relates more specifically to methods of determining transit costs for network links.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Enterprises that host or manage large networks, such as Internet service providers (ISPs), commonly deploy virtual private networks (VPNs) so that ISP customers can securely communicate private data across non-secure semi-public Internet nodes. An ISP network comprising provider edge (PE) routers, core network routers, and other elements may be termed an autonomous system (AS). Such systems commonly use Border Gateway Protocol (BGP), as defined in Request for Comments (RFC) 1771 of the Internet Engineering Task Force (IETF), for exchanging route information ("prefixes") and reachability information with other systems.

Current practices provide no effective way for managers of BGP VPNs to determine or account for transit costs of traffic passing through a service provider. In addition, the transit cost between multiple autonomous systems also is not considered. Thus, current practices provide no effective way for any customer edge (CE) router to find the shortest path for a prefix with multiple paths traversing several autonomous systems within the same administrative domain.

Figure 1:
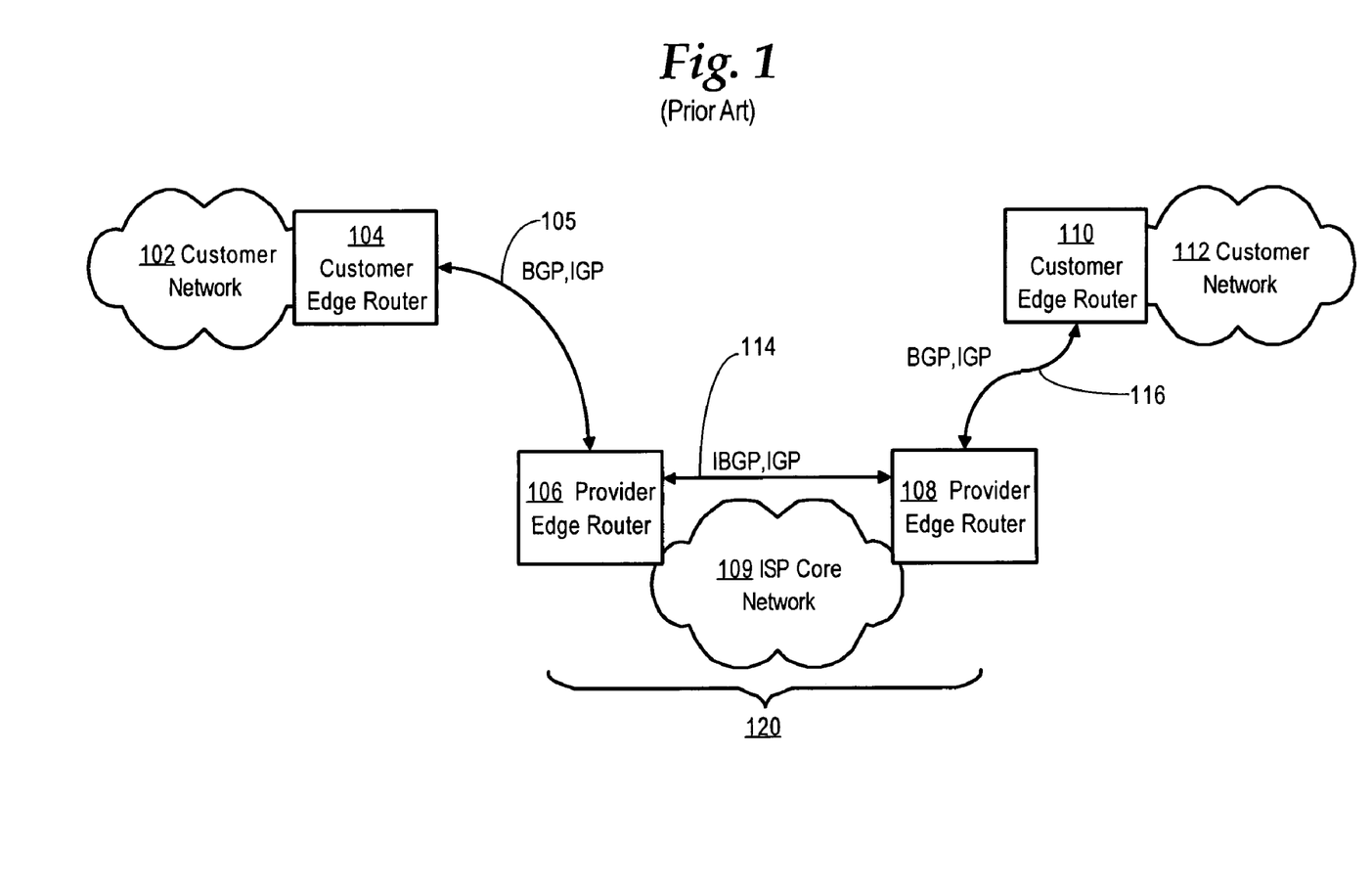
FIG. 1 is a block diagram that illustrates an example network configuration of the prior art.

For the purpose of illustrating one relevant problem, FIG. 1 is a block diagram of an example network configuration. A customer network 102 has a CE router 104 that is coupled by link 105 to a PE router 106 associated with an ISP core network 109. PE router 106 is coupled by link 114 through ISP core network 109 to a second PE router 108, which is linked to CE router 110 by link 116. The second CE router 110 is associated with a separate customer network 112 of a different customer of the ISP. PE routers 106, 108 and core network 109 are associated with one ISP 120. Thus, in FIG. 1 the first and second CE routers 104, 110 are connected indirectly via a common ISP 120. CE router 104 and PE router 106 could run either BGP (and either exterior BGP [EBGP] or interior BGP [IBGP]) or an interior gateway protocol (IGP) over link 105. Similarly, PE routers 106, 108 on link 114, and PE router 108 and CE router 110 on link 116 could run any of IBGP and IGP.

In this scenario, for a route that is originated by CE router 104, and reaches CE router 110 via PE routers 108, 106, CE router 110 currently has no way to calculate the total cost for it to reach CE router 104. Generally, there is currently no way to calculate a total cost value that reflects cost values that are developed independently by different routing protocols, and there is no way to do so between EBGP and IGP in particular.

Having a way to compute total link cost or transit cost between different routing protocols would be particularly useful when there are different routing paths available via different routing protocols, or the same routing protocols, running under the same administrative domain. For example, a customer of multiple service providers may wish to select the shortest path for a given route automatically. Currently, no automatic selection mechanism exists, and path selection, in this case, is performed by manual configuration.

No other solutions that attempt to resolve this problem are known. One cost communication mechanism, which does not solve the problem identified herein, is described in Retana et al., in the document named "draft-retana-bgp-custom-decision-00.txt," available at the IETF web site and Internet-draft archive sources. Retana et al. propose a mechanism for extending community attributes to carry a cost of a route within one BGP domain or autonomous system. When route information is communicated outside an AS, the cost value is lost. Thus, the mechanism of Retana et al. cannot be used to transport a cost of a route across the boundaries of autonomous systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for determining transit costs across one or more autonomous systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Determining Transit Costs Across Autonomous Systems That Use Various Protocols
      3.1 Receive Routes From Originating CE Router
      3.2 Announce Routes Within An Autonomous System Using BGP
      3.3 Announce Routes Outside An Autonomous System Using BGP
      3.4 CE Router Receiving Routes
      3.5 Benefits And Conclusions
   4.0 Implementation Mechanisms-Hardware Overview
   5.0 Extensions and Alternatives

1.0 General Overview

The needs identified in the foregoing Background, and other needs and objects that will become apparent for the following description, are achieved in the present invention, which comprises, in one aspect, a method for determining a cumulative network layer reachability cost of traversing one or more autonomous network routing systems, the method comprising the computer-implemented steps of receiving first network route information from an originating customer edge router, wherein the first network route information identifies a route in a customer network; determining a transit cost from the provider edge router to an endpoint associated with the originating customer edge router based upon a metric value received in a cost community attribute; repeating the determining step for each of one or more autonomous systems that lie in a path from the originating customer edge router to a destination customer edge router, to result in determining an accumulated transit costs across one or more autonomous systems; and determining, based at least in part upon the accumulated transit cost, a best path from the provider edge router to the endpoint associated with the originating customer edge router. The one or more autonomous systems may be owned or operated by one or more Internet Service Providers.

In another aspect, the invention provides a method comprising the computer-implemented steps of receiving first network route information from an originating customer edge router, wherein the first network route information identifies a route in a customer network; determining a cost metric value for the route and storing the cost metric value in a Border Gateway Protocol (BGP) cost community attribute of a route update message; sending the route announcement message to an egress provider edge router, wherein the route announcement message includes the route identified in the first network route information and the cost community attribute; determining a transit cost from the egress provider edge router to an endpoint associated with the originating customer edge router based upon the metric value in the cost community attribute; determining, based at least in part upon the transit cost, a best path from the egress provider edge router to the endpoint associated with the originating customer edge router.

In one feature of this aspect, communications with the originating customer edge router use an interior gateway protocol (IGP), and a normalized IGP cost of the route is determined, as part of determining the cost metric value.

In another feature, communications with the originating customer edge router use BGP, the communications traverse a service provider network, and the service provider network uses a Route Reflector to reflect routes across an autonomous system in the service provider network. In one alternative, the Route Reflector performs reflecting the best path without modifying the cost community attribute.

In another feature, communications to the provider edge router use external border gateway protocol (EBGP), the provider edge router is outside an autonomous system, and the method further involves removing the cost community attribute; determining an IGP cost of a nexthop associated with the route based at least in part on the cost metric value; normalizing the IGP cost; determining a sum of a normalized IGP cost and the cost metric value; and sending the sum in a multi-exit discriminator (MED) attribute of an EGBP message to EGBP neighbor nodes of the provider edge router.

In yet another feature, the method includes removing the cost community attribute; determining an IGP cost of a nexthop associated with the route based at least in part on the cost metric value; normalizing the IGP cost; determining a sum of a normalized IGP cost and the cost metric value; converting the sum to an IGP metric value; and sending the route announcement message to a second customer edge router using IGP, wherein the route announcement message includes the IGP metric value.

In still another feature, the provider edge router communicates with a second customer edge router using a BGP, and the second customer edge router is multihomed, and the method further involves sending a second route announcement message, which includes the transit cost value, to a second customer edge router; at the second customer edge router, determining a bestpath to the originating customer edge router based on always comparing BGP MED values for a first autonomous system that includes the provider edge router and a second autonomous system that includes the customer edge router, and storing the bestpath in a router information base (RIB) of the customer edge router.

In a further feature, the provider edge router communicates with a second customer edge router using a BGP, the second customer edge router is not multihomed, and the method further involves sending a second route announcement message, which includes the transit cost value, to a second customer edge router; at the second customer edge router, determining a bestpath to the originating customer edge router based on comparing BGP MED values for a first autonomous system that includes the provider edge router and a second autonomous system that includes the customer edge router, and storing the bestpath in a router information base (RIB) of the customer edge router.

In another feature the provider edge router communicates with a second customer edge router using an IGP, the second customer edge router is multihomed, and the method further comprises sending a second route announcement message, which includes the transit cost value, to a second customer edge router; at the second customer edge router, determining a bestpath to the originating customer edge router based on IGP cost metric values, and storing the bestpath in a router information base (RIB) of the customer edge router. The steps may be performed by one or more provider edge routers that are within one or more autonomous systems that are owned or operated by one or more Internet Service Providers.

In other aspects, the invention encompasses a computer apparatus and a computer-readable medium configured to carry out the foregoing steps.

2.0 Structural and Functional Overview

Figure 2:
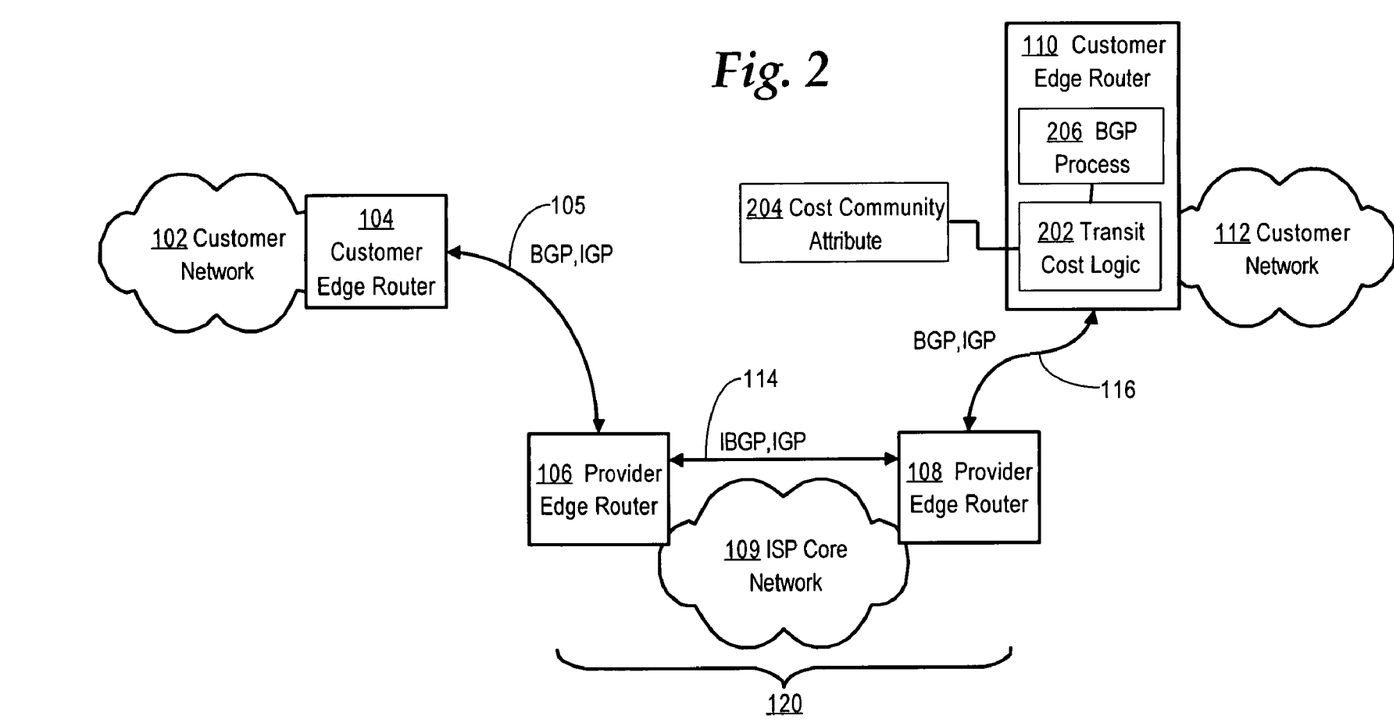
FIG. 2 is a block diagram that illustrates an example network configuration that may be used to implement an embodiment.
Figure 3:
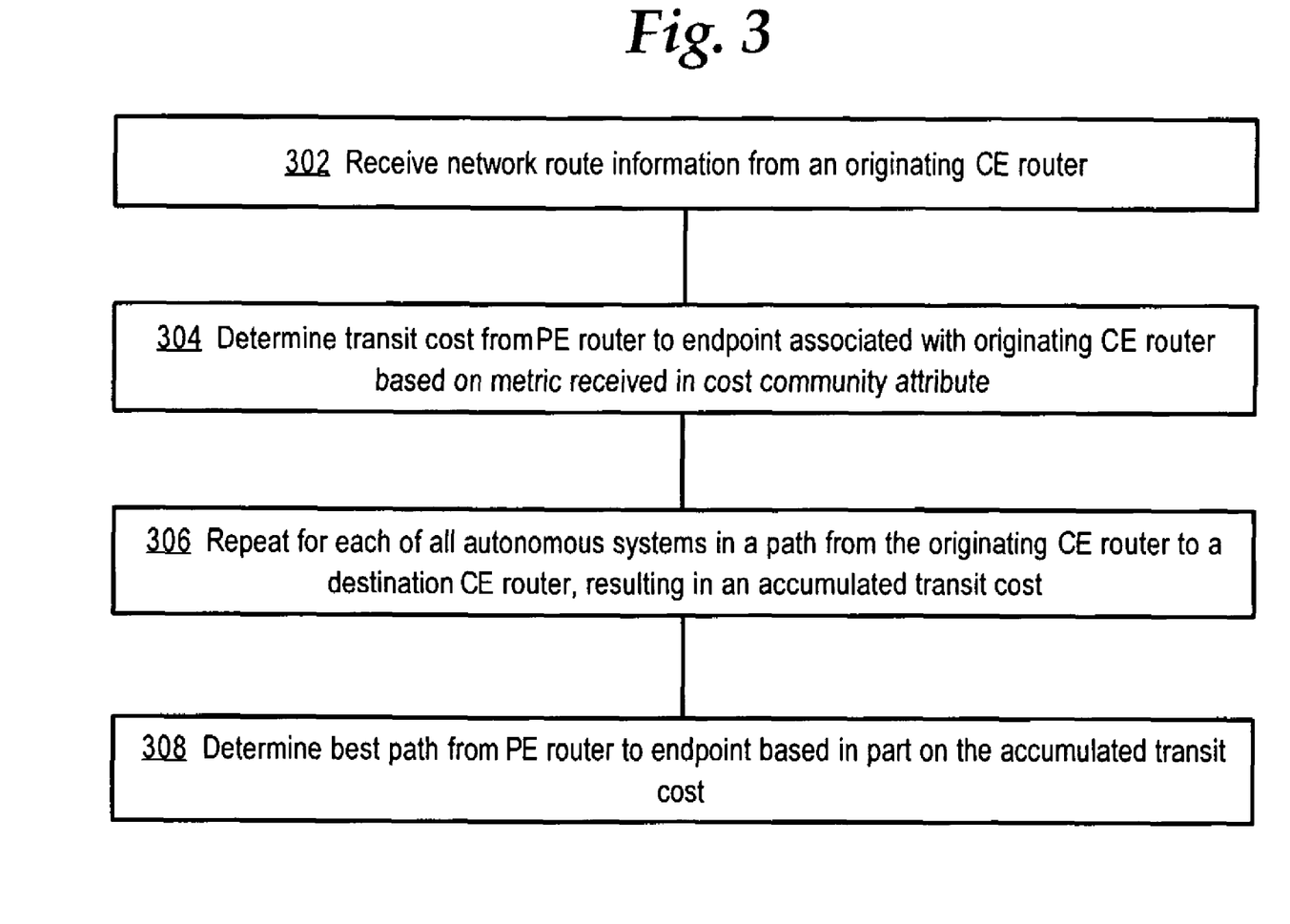
FIG. 3 is a flow diagram showing a high-level view of a process for determining a transit cost.

FIG. 2 is a block diagram that illustrates an example network configuration that may be used to implement an embodiment. FIG. 3 is a flow diagram showing a high-level view of a process for determining a transit cost.

Referring first to FIG. 2, as in FIG. 1, a customer network 102 has a CE router 104 that is coupled by link 105 to a PE router 106 associated with an ISP core network 109. PE router 106 is coupled by link 114 through ISP core network 109 to a second PE router 108, which is linked to CE router 110 by link 116. The second CE router 110 is associated with a separate customer network 112 of a different customer of the ISP. PE routers 106, 108 and core network 109 are associated with one ISP 120. The first and second CE routers 104, 110 are connected indirectly via a common ISP 120. CE router 104 and PE router 106 may run BGP (EBGP or IBGP) or an IGP protocol over link 105. Similarly, PE routers 106, 108 on link 114, and PE router 108 and CE router 110 on link 116 could run any of IBGP and IGP protocol.

CE router 110 hosts a BGP process 206 that includes or is associated with transit cost logic 202, and can form one or more cost community attributes 204 for use in BGP messages to other nodes. The transit cost logic 202 comprises one more computer program instructions or other software elements that implement the functions described herein. The particular functions that are implemented as part of transit cost logic 202 may vary according to which protocols are used on links 105, 114, 116. Transit cost logic 202 may implement all such functions and may provide an administrative interface for configuring or selecting particular protocols or functions. Transit cost logic 202 may form an integral part of a BGP process or agent, or may be integrated into an operating system that controls and supervises operations of a router, or may comprise an independent software element.

FIG. 3 is now described with reference to FIG. 2 as an example context. However, the approach of FIG. 3 is broadly applicable to other network contexts. At step 302, network route information is received from an originating CE router. For example, PE router 108 receives a route in a BGP UPDATE message from CE router 110.

At step 304, a transit cost from a PE router to an endpoint associated with the originating CE router is determined, based on a metric that is received in a cost community attribute. For example, the BGP UPDATE message received from CE router 110 includes a cost metric value in a BGP cost community attribute, as that attribute is defined by Retana et al. PE router 108 combines the cost metric in the cost community attribute with a known link cost associated with link 116 to arrive at a transit cost.

At step 306, the process of step 304 is repeated for all links and nodes of all autonomous systems that are in a path from the originating CE router to a destination CE router, resulting in creating an accumulated transit cost. Particular techniques for accumulating a transit cost in the context of various protocols are described further below. In the context of FIG. 2, the pertinent path is from CE router 110 to CE router 104.

At step 308, a best path from a PE router to an endpoint is determined, based in part on the accumulated transit cost. Thus, PE router 108 can compute a value for a bestpath attribute of a BGP route table, for a path from the PE router to an endpoint in customer network 102, based in part on the accumulated transit cost. In doing so, the PE router 108 can take into account multiple accumulated transit cost values that have been determined.

Generally, embodiments of the invention provide a mechanism within BGP to account for IGP metrics of links traversed within each AS, and to pass cost values represented by the metrics along with the path information. The approaches herein also provide for conversion or normalization of different metrics as used by different platforms and protocols. This allows remote CE routers, receiving multiple paths to prefixes originating from a CE router in a different AS but in the same administrative domain, to choose shortest paths to such prefixes. The following sections describe in depth processing as performed at an originating CE router and its ISP, processing among PE routers that use IBGP within an ISP, and processing for interactions of a PE router and a CE router (that is, from the ISP to a destination CE).

Figure 4:
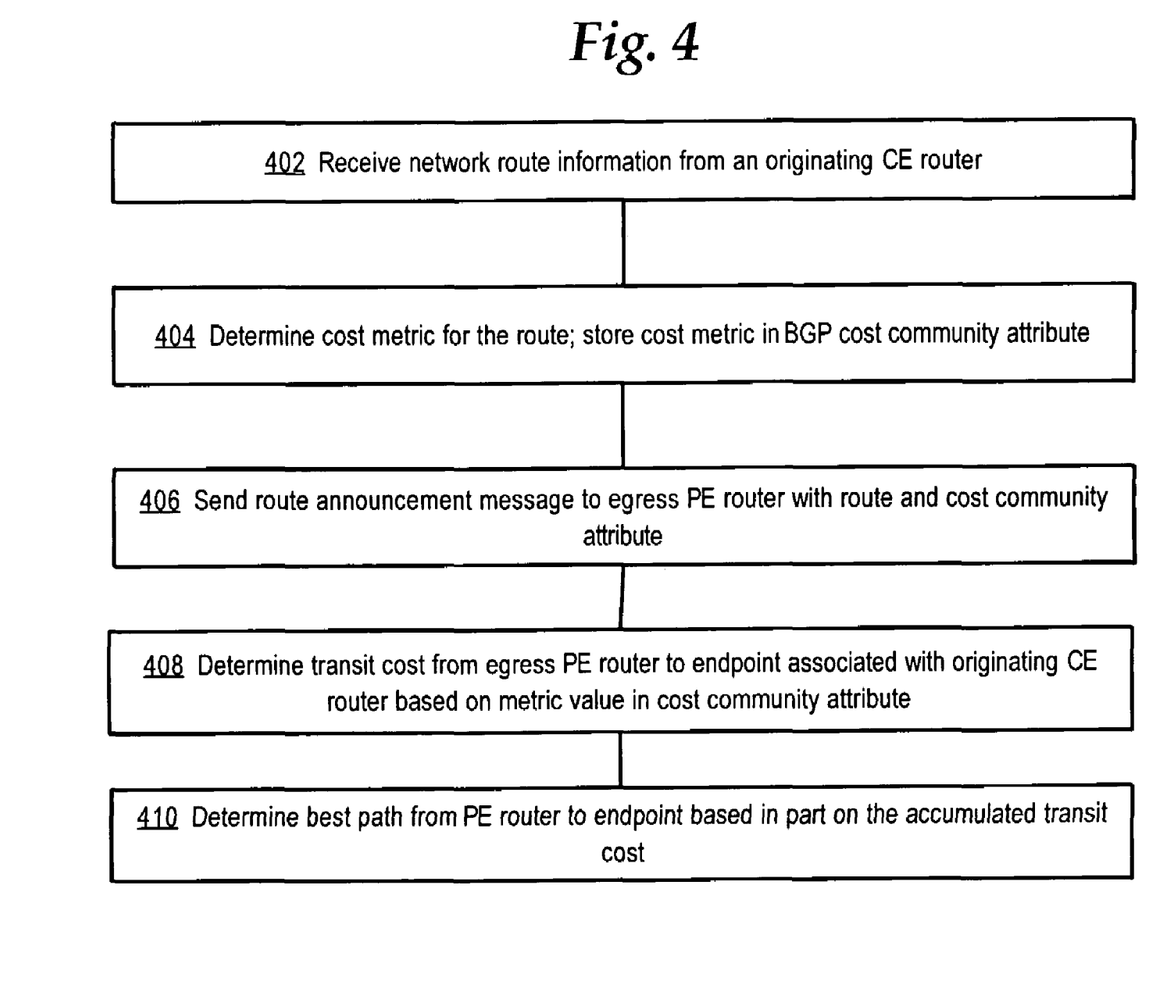
FIG. 4 is a flow diagram showing an alternative process for determining a transit cost.
Figure 5A:
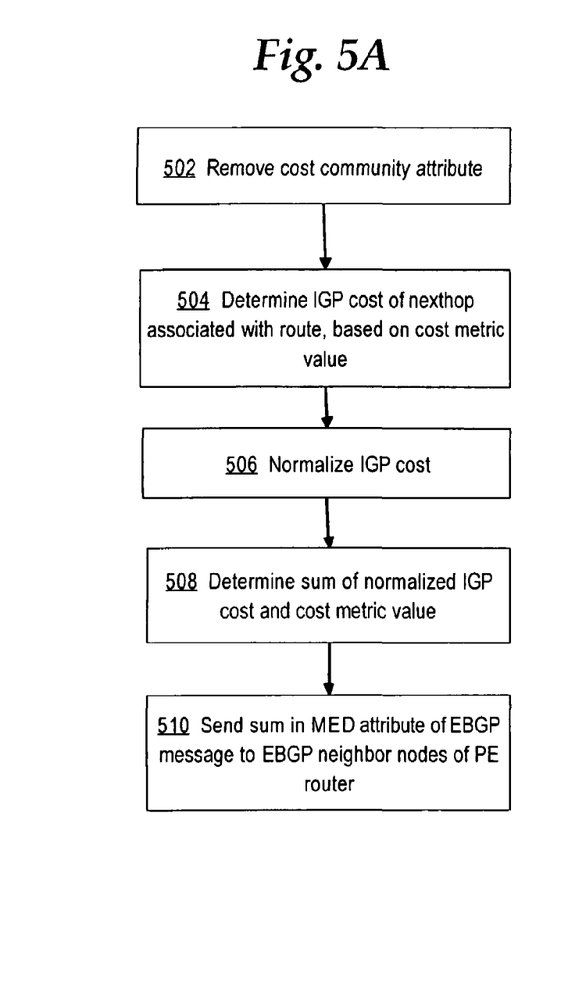
FIG. 5A, FIG. 5B are flow diagrams showing steps for determining and communicating cost metric values for EBGP and IGP deployments.
Figure 5B:
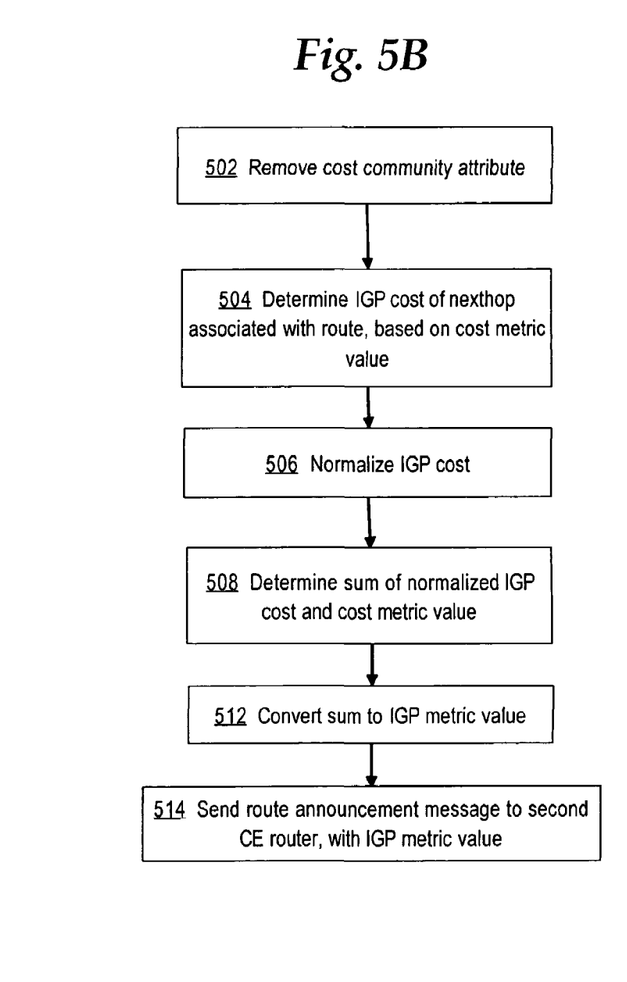
Figure 6:
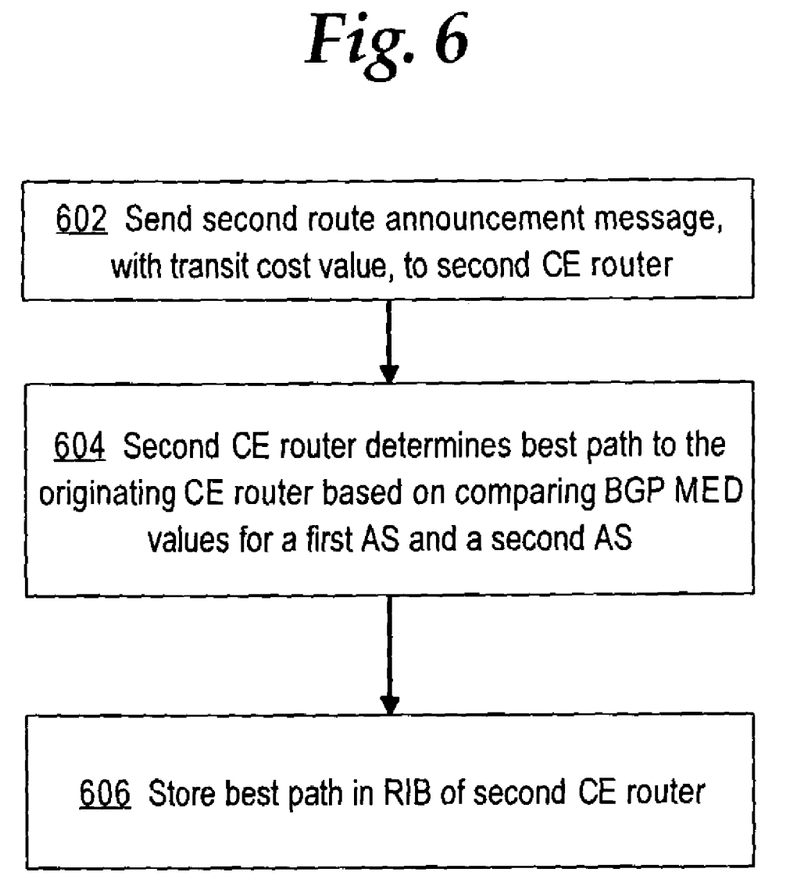
FIG. 6 is a flow diagram showing steps for determining a best path using a transit cost value.

3.0 Determining Transit Costs Across Autonomous Systems That Use Various Protocols FIG. 4 is a flow diagram showing an alternative process for determining a transit cost; FIG. 5A, FIG. 5B are flow diagrams showing steps for determining and communicating cost metric values for EBGP and IGP deployments; and FIG. 6 is a flow diagram showing steps for determining a best path using a transit cost value. FIG. 4-6 are now described with reference to particular techniques for accumulating a transit cost value across one or more autonomous systems, depending on which of several protocols are in use.

3.1 Receive Routes From Originating CE Router

Referring now to FIG. 4, in step 402, network route information is received from an originating CE router, and in step 404, a cost metric for the route is received and the cost metric is stored in the BGP cost community attribute. Thus, whenever a BGP PE router (for example, PE routers 106, 108 of FIG. 2) receives a route from a connecting BGP CE router (such as CE routers 104, 110), the PE router stores the received metric value using the BGP Cost Community attribute. The BGP Cost Community attribute can be created at the PE router and attached to a BGP update.

If the PE router and the CE router run an IGP, then the normalized IGP cost of the route is stored in the BGP Cost Community attribute when the PE router redistributes the route within an IBGP network. IGP costs are normalized using the following equation:

$$\text{Cost}=\text{Integer}(A*A'*X)+B<=255$$

where A is chosen to fit a particular IGP based on the relation A=(255/IGP maximum metric); A' and B Are chosen by the user to fit a particular application; and X is the IGP metric.

The purpose of normalization is to transform IGP cost values into an equivalent value within the range of values allowed for the BGP Cost Community attribute as defined by Retana et al. Thus, normalization as described herein enables an implementation to account for differences in how various protocols, and policies of service providers, format or express metrics or cost values. For example, one ISP may internally track cost values per link mile and another may define a cost metric as a cost per link kilometer. Normalization resolves these differences.

3.2 Announce Routes Within an Autonomous System Using BGP

At step 406, a route announcement message is sent to an egress PE router with the route and the cost community attribute. For example, whenever a PE router announces routes to its IBGP peers or to a Route Reflector node, the PE router passes the Cost Community attribute with the metric value stored in the attribute.

At step 408, a transit cost from the egress PE router to an endpoint associated with the originating CE router is determined, based on the metric value in the Cost Community attribute. At step 410, a best path from the PE router to the endpoint is determined based in part on the accumulated transit cost. Thus, both IBGP neighbor nodes and BGP Route Reflector nodes use the Cost Community metric for best path selection, according to the Cost Community rules of Retana et al.

Further, a BGP Route Reflector reflects the best path selected to its IBGP or BGP route reflection client nodes and to any EBGP neighbors. A BGP Route Reflector does not modify the Cost Community attribute during announcement of the best paths. A BGP Route Reflector also leaves the nexthop value unchanged whenever the Route Reflector reflects, thereby allowing peers to forward data directly to the BGP router that announced the route to the Route Reflector. With this approach, receiving IBGP routers can directly and dynamically calculate a complete transit cost to the ingress IBGP router that had announced the route to the BGP Route Reflector.

If the Route Reflector has the "nexthop-self" mechanism configured, the Route Reflector performs the following steps. First, the Route Reflector computes the IGP cost to the nexthop of the route, which will be the address of a PE router that is injecting the route in the AS, by performing a reverse path forwarding (RPF) route lookup and using the metric in the IGP route that is found. Second, the Route Reflector normalizes the computed IGP cost and adds the normalized cost to the metric value that was received in the Cost Community metric. The summation step yields the total metric for a route to its destination. IGP costs are normalized using the equation described above.

Third, the Route Reflector sends the newly computed metric as the cost value in BGP Cost Community attribute to all its IBGP neighbor nodes, and to the BGP Route Reflector client nodes. If the receiving routers are IBGP neighbor nodes, such routers will be calculating IGP cost and follow the rule sets specified in next section 3.3.

3.3 Announce Routes Outside an Autonomous System Using BGP

Referring now to FIG. 5A, whenever BGP routes with the Cost Community attribute are sent out of an AS using EBGP PE routers that implement the present approach, the following steps are performed. At step 502, the Cost Community attribute is removed from an UPDATE message and the metric value contained therein may be stored. At step 504, the IGP cost to the next hop of the route, which is the address of a PE router that is injecting the route in the AS, is determined. In one embodiment, the IGP cost is determined by performing an RPF lookup and using the metric in the IGP route that is found.

At step 506, the computed IGP cost is normalized, and added to the metric value received in the Cost Community metric at step 508. The sum or result is the total metric for a route to its destination. The IGP cost may be normalized using the equation described above.

At step 510, the newly computed metric is sent as a MED value for the routes to the EBGP neighbors. In a BGP implementation, the multi-exit discriminator (MED) or metric attribute generally is used as a suggestion to an external AS regarding the preferred route into the AS that is advertising the metric.

Referring now to FIG. 5B, whenever PE routers send routes with the Cost Community attribute to CE routers using an IGP, then the following steps are performed. At step 502, the Cost Community attribute is removed from an UPDATE message and the metric value contained therein may be stored. At step 504, the IGP cost to the next hop of the route, which is the address of a PE router that is injecting the route in the AS, is determined. In one embodiment, the IGP cost is determined by performing an RPF lookup and using the metric in the IGP route that is found.

At step 506, the computed IGP cost is normalized, and added to the metric value received in the Cost Community metric at step 508. The sum or result is the total metric for a route to its destination. The IGP cost may be normalized using the equation described above.

At step 512, the resulting BGP Cost Community attribute metric value is converted to an IGP metric using the following relation:

$$IGP\ Metric = Integer(A * A' * X) + B$$

where A is chosen to fit a particular IGP based on the relation A=(255/IGP maximum metric), A' and B are chosen by the user to fit a particular application, and X is the BGP Cost Community attribute metric value.

At step 514, the newly computed metric is sent as an IGP cost value for routes to IGP neighbor nodes.

3.4 CE Router Receiving Routes

FIG. 6 illustrates steps involved when a CE router running an IGP or a BGP with the PE router receives a route from the PE router. For purposes of illustration, assume that after the preceding processes, at step 602 a second route announcement message is sent to a second CE router, with the transit cost value computed as given above. At step 604, the second CE router determines the best path to the originating CE router based on comparing BGP MED values for a first AS and a second AS.

If the receiving CE router and the PE router are running BGP and if the CE router is multi-homed, a configuration option that causes the BGP process always to compare MED values may be set. For example, in an implementation with Cisco devices, the "bgp always_compare_med" configuration option may be enabled, particularly if the autonomous systems are under a single administrative domain. Comparing MED values resolves the shorter path as a best path for purposes of BGP, and that best path is installed in the routing information base (RIB).

If the CE router and the PE router are running BGP, and the CE router is not multi-homed, then MED values should resolve the shorter path as a best path, and that best path is installed in the RIB.

If the CE router and the PE router are running IGP, then IGP route metrics are compared, and the resulting best path is installed in the RIB.

3.5 Benefits and Conclusions

The approaches herein provide a mechanism to calculate the cumulative network layer reachability cost of traversing a single autonomous system, or multiple autonomous systems, taking into account the internal cost of traversing each AS. For example, assume that an ISP has a network with routers located in Los Angeles, Chicago, and New York, and these routers are organized as a single autonomous system. Embodiments of the invention enable computation of cost metrics such that a path from Chicago to New York has a cost less than New York to Los Angeles. In past practice, the entire AS is viewed as a unit with a single cost for all paths.

The approaches herein also provide a method to normalize different IGP metrics to the value range allowed for the BGP Cost Community attribute.

The approaches herein can allow a customer of multiple service providers to select the shortest path for a given route automatically. The approaches herein may be implemented or deployed in any BGP network, but will typically interest service providers that are administering multiple autonomous systems, and MPLS VPN customers of such service providers.

The approaches herein also can be used to carry a customer IGP metric across the nodes that a service provider uses to implement a VPN, thus enabling the customer router equipment to calculate the best path among VPN and IGP paths that are available.

4.0 Implementation Mechanisms—Hardware Overview

Figure 7:
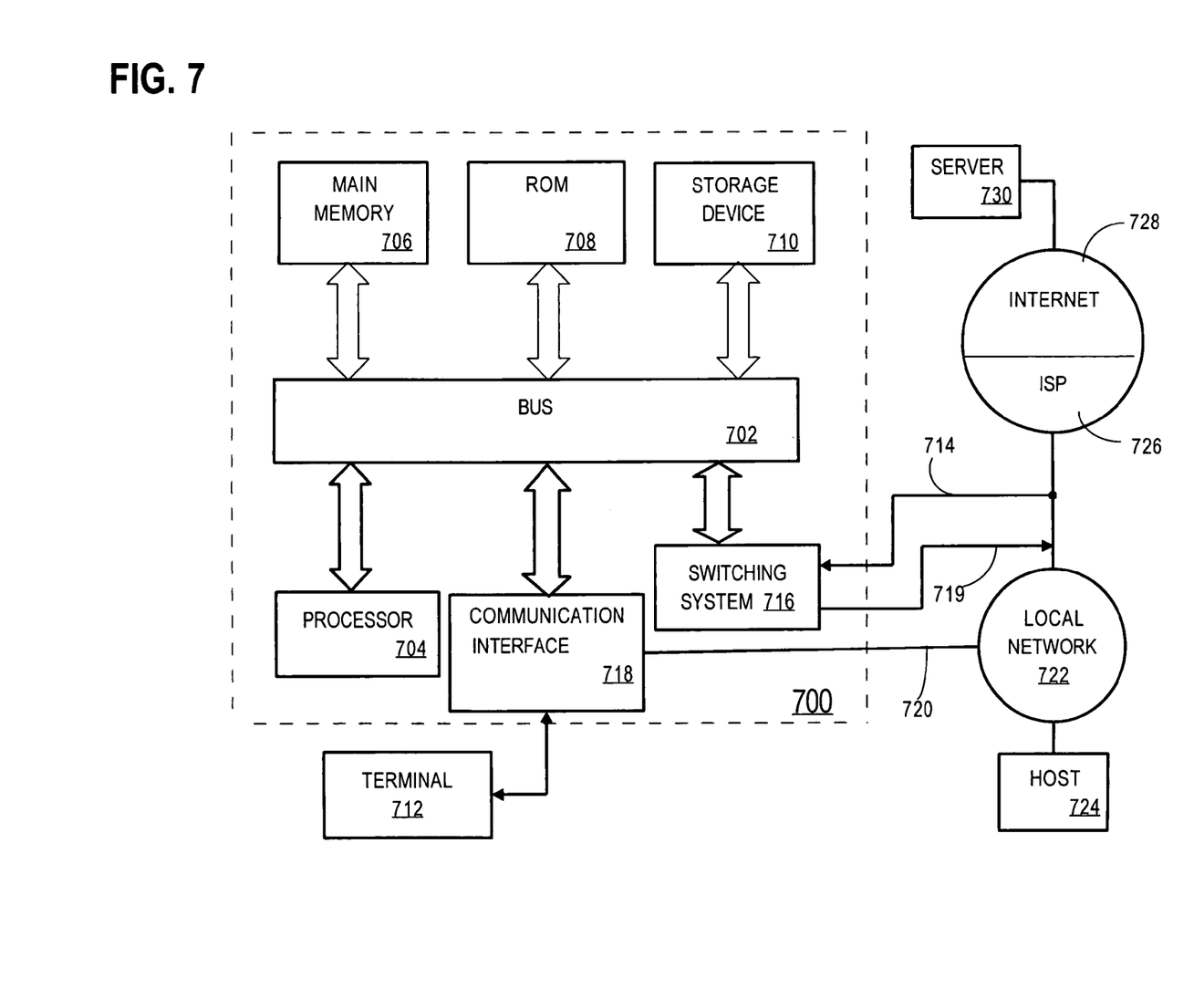
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for determining transit costs across one or more autonomous systems. According to one embodiment of the invention, determining transit costs across one or more autonomous systems is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for determining transit costs across autonomous systems as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network communication apparatus operating as an ingress provider edge router and comprising:
   one or more network interfaces;
   one or more processors coupled to the network interfaces for receiving packet flows therefrom;
   a computer-readable medium comprising one or more sequences of instructions which, when executed by the one or more processors, cause the one or more processors to perform the steps of:
   receiving first network route information from an originating customer edge router by the ingress provider edge router, wherein the first network route information identifies a route from an end point associated with the originating customer edge router to the ingress provider edge router, wherein the first network route information comprises a cost metric value comprising a first transit cost for the route;
   storing the cost metric value for the route in a Border Gateway Protocol (BGP) cost community attribute;
   sending a route announcement message to an egress provider edge router by the ingress provider edge router, wherein the route announcement message includes the route identified in the first network route information and the cost community attribute with the cost metric value for the route;
   determining a second transit cost from the egress provider edge router to the ingress provider edge router;
   adding at least the second transit cost from the egress provider edge router to the ingress provider edge router with the first transit cost to obtain a total transit cost from the egress provider edge router to an endpoint associated with the originating customer edge router;
   determining, based at least in part upon the total transit cost from the egress provider edge router to the endpoint associated with the originating customer edge, a best path from the egress provider edge router to the endpoint associated with the originating customer edge router.

2. A network communication apparatus as recited in claim 1, wherein determining the second transit cost from the egress provider edge router to the ingress provider edge router comprises determining an interior gateway protocol (IGP) cost, and normalizing the IGP cost to obtain the second transit cost from the egress provider edge router to the ingress provider edge router.

3. A network communication apparatus as recited in claim 1, wherein communications with the originating customer edge router use BGP, wherein said communications traverse a service provider network, wherein the service provider network uses a Route Reflector to reflect routes across an autonomous system in the service provider network.

4. A network communication apparatus as recited in claim 3, wherein the Route Reflector performs reflecting the best path without modifying the cost community attribute.

5. A network communication apparatus as recited in claim 1, wherein communications to the egress provider edge router use external border gateway protocol (EBGP), wherein the provider edge router is outside an autonomous system, and wherein the computer-readable medium further comprises instructions for:
   removing the cost community attribute;
   determining an IGP cost of a nexthop associated with the route based at least in part on the cost metric value;
   normalizing the IGP cost;
   determining a sum of the normalized IGP cost and the cost metric value; and
   sending the sum in a multi-exit discriminator (MED) attribute of an EGBP message to EGBP neighbor nodes of the egress provider edge router.

6. A network communication apparatus as recited in claim 1, wherein the egress provider edge router communicates with a second customer edge router using a BGP, wherein the second customer edge router is multihomed, wherein the computer-readable medium further comprises instructions for:
   sending a second route announcement message, which includes the total transit cost from the egress provider edge router to the endpoint associated with the originating customer edge router, to the second customer edge router;
   at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

7. A network communication apparatus as recited in claim 1, wherein the egress provider edge router communicates with a second customer edge router using a BGP, wherein the second customer edge router is not multihomed, and wherein the computer-readable medium further comprises instructions for:
   sending a second route announcement message, which includes the total transit cost from the egress provider edge router to the endpoint associated with the originating customer edge router, to the second customer edge router;
   at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

8. A network communication apparatus as recited in claim 1, wherein the egress provider edge router communicates with a second customer edge router using an IGP, wherein the second customer edge router is multihomed, and wherein the computer-readable medium further comprises instructions for:
   sending a second route announcement message, which includes the total transit cost from the egress provider edge router to the endpoint associated with the originating customer edge router, to the second customer edge router;
   at the second customer edge router, determining a bestpath to the originating customer edge router based on the total transit cost from the egress provider edge router to the endpoint associated with the originating customer edge router, and storing the bestpath in a router information base (RIB) of the second customer edge router.

9. A network communication apparatus as recited in claim 1, wherein the network communication apparatus is coupled within one or more autonomous systems that are owned or operated by one or more Internet Service Providers.

10. A network communication apparatus as recited in claim 1, wherein the computer-readable medium further comprises instructions for:
removing the cost community attribute;
determining an IGP cost of a nexthop associated with the route based at least in part on the cost metric value;
normalizing the IGP cost;
determining a sum of the normalized IGP cost and the cost metric value;
converting the sum to an IGP metric value; and
sending the route announcement message to a second customer edge router using IGP, wherein the route announcement message includes the IGP metric value.

11. A network communication apparatus operating as a provider edge router and comprising:
one or more network interfaces;
one or more processors coupled to the network interfaces for receiving packet flows therefrom;
a computer-readable medium comprising one or more sequences of instructions which, when executed by the one or more processors, cause the one or more processors to perform the steps of:
receiving first network route information from an originating customer edge router by the provider edge router, wherein the first network route information identifies a route in a customer network;
determining a first total transit cost from the provider edge router to an endpoint associated with the originating customer edge router through a first autonomous system based upon adding at least a cost metric value comprising a first transit cost for the route received in a cost community attribute and a second transit cost across the first autonomous system;
determining a second total transit cost from the provider edge router to an endpoint associated with the originating customer edge router through a second autonomous system, different from the first autonomous system, based upon adding at least the cost metric value comprising the first transit cost for the route received in a cost community attribute and a third transit cost across the second autonomous system;
determining, based at least in part upon the first total transit cost and the second total transit cost, a best path from the provider edge router to the endpoint associated with the originating customer edge router, wherein the best path is through one of the first autonomous system or the second autonomous system.

12. A network communication apparatus as recited in claim 11, wherein one or more of the first autonomous system and the second autonomous system are owned or operated by one or more Internet Service Providers.

13. A method, comprising the computer-implemented steps of:
receiving first network route information from an originating customer edge router by the ingress provider edge router, wherein the first network route information identifies a route in a customer network and a cost metric value comprising a first transit cost for the route;
storing the cost metric value for the route in a Border Gateway Protocol (BGP) cost community attribute;
sending a route announcement message to an egress provider edge router by the ingress provider edge router, wherein the route announcement message includes the route identified in the first network route information and the cost community attribute with the cost metric value for the route;
determining a second transit cost from the egress provider edge router to the ingress provider edge router;
adding at least the second transit cost from the egress provider edge router to the ingress provider edge router with the first transit cost to obtain a total transit cost from the egress provider edge router to an endpoint associated with the originating customer edge router;
determining, based at least in part upon the total transit cost from the egress provider edge router to the endpoint associated with the originating customer edge, a best path from the egress provider edge router to the endpoint associated with the originating customer edge router.

14. A method as recited in claim 13, wherein determining the second transit cost from the egress provider edge router to the ingress provider edge router comprises determining an interior gateway protocol (IGP) cost, and normalizing the IGP cost to obtain the second transit cost from the egress provider edge router to the ingress provider edge router.

15. A method as recited in claim 13, wherein communications with the originating customer edge router use BGP, wherein said communications traverse a service provider network, wherein the service provider network uses a Route Reflector to reflect routes across an autonomous system in the service provider network.

16. A method as recited in claim 15, wherein the Route Reflector performs reflecting the best path without modifying the cost community attribute.

17. A method as recited in claim 13, wherein communications to the egress provider edge router use external border gateway protocol (EBGP), wherein the egress provider edge router is outside an autonomous system, and further comprising:
removing the cost community attribute;
determining an IGP cost of a nexthop associated with the route based at least in part on the cost metric value;
normalizing the IGP cost;
determining a sum of the normalized IGP cost and the cost metric value; and
sending the sum in a multi-exit discriminator (MED) attribute of an EGBP message to EGBP neighbor nodes of the egress provider edge router.

18. A method as recited in claim 13, further comprising:
removing the cost community attribute;
determining an IGP cost of a nexthop associated with the route based at least in part on the cost metric value;
normalizing the IGP cost;
determining a sum of the normalized IGP cost and the cost metric value;
converting the sum to an IGP metric value; and
sending the route announcement message to a second customer edge router using IGP, wherein the route announcement message includes the IGP metric value.

19. A method as recited in claim 13, wherein the provider edge router communicates with a second customer edge router using a BGP, wherein the second customer edge router is multihomed, and further comprising:
sending a second route announcement message, which includes the total transit cost from the egress provider edge router to the endpoint associated with the originating customer edge router, to the second customer edge router;

at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

20. A method as recited in claim 13, wherein the egress provider edge router communicates with a second customer edge router using a BGP, wherein the second customer edge router is not multihomed, and further comprising:
sending a second route announcement message, which includes the total transit cost from the egress provider edge router to the endpoint associated with the originating customer edge router, to the second customer edge router;
at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

21. A method as recited in claim 13, wherein the egress provider edge router communicates with a second customer edge router using an IGP, wherein the second customer edge router is multihomed, and further comprising:
sending a second route announcement message, which includes the total transit cost from the egress provider edge router to the endpoint associated with the originating customer edge router, to the second customer edge router;
at the second customer edge router, determining a bestpath to the originating customer edge router based on the total transit cost from the egress provider edge router to the endpoint associated with the originating customer edge router, and storing the bestpath in a router information base (RIB) of the second customer edge router.

22. A method as recited in claim 13, wherein the steps are performed by one or more provider edge routers that are within one or more autonomous systems that are owned or operated by one or more Internet Service Providers.

23. An apparatus operating as a provider edge router for determining a cumulative network layer reachability cost of traversing one or more autonomous network routing systems, comprising:
means for receiving first network route information from an originating customer edge router by the provider edge router, wherein the first network route information identifies a route in a customer network;
means for determining a first total transit cost from the provider edge router to an endpoint associated with the originating customer edge router through a first autonomous system based upon adding at least a cost metric value comprising a first transit cost for the route received in a cost community attribute and a second transit cost across the first autonomous system;
means for determining a second total transit cost from the provider edge router to an endpoint associated with the originating customer edge router through a second autonomous system, different from the first autonomous system based upon adding at least the cost metric value comprising the first transit cost for the route received in a cost community attribute and a third transit cost across the second autonomous system;
means for determining, based at least in part upon the first total transit cost and the second total transit cost, a best path from the provider edge router to the endpoint associated with the originating customer edge router, wherein the best path is through one of the first autonomous system or the second autonomous system.

24. A network communication apparatus operating as an ingress provider edge router and comprising:
means for receiving first network route information from an originating customer edge router by the ingress provider edge router, wherein the first network route information identifies a route in a customer network and a cost metric value comprising a first transit cost for the route;
means for storing the cost metric value for the route in a Border Gateway Protocol (BGP) cost community attribute;
means for sending a route announcement message to an egress provider edge router by the ingress provider edge router, wherein the route announcement message includes the route identified in the first network route information and the cost community attribute with the cost metric value for the route; means for determining a second transit cost from the egress provider edge router to the ingress provider edge router;
means for adding at least the second transit cost from the egress provider edge router to the ingress provider edge router with the first transit cost to obtain a total transit cost from the egress provider edge router to an endpoint associated with the originating customer edge router;
means for determining, based at least in part upon the total transit cost from the egress provider edge router to the endpoint associated with the originating customer edge, a best path from the egress provider edge router to the endpoint associated with the originating customer edge router.

25. A network communication apparatus as recited in claim 24, wherein determining the transit cost from the egress provider edge router to the ingress provider edge router comprises determining an interior gateway protocol (IGP) cost, and normalizing the IGP cost to obtain the transit cost from the egress provider edge router to the ingress provider edge router.

26. A network communication apparatus as recited in claim 24, wherein communications with the originating customer edge router use BGP, wherein said communications traverse a service provider network, wherein the service provider network uses a Route Reflector to reflect routes across an autonomous system in the service provider network.

27. A network communication apparatus as recited in claim 26, wherein the Route Reflector performs reflecting the best path without modifying the cost community attribute.

28. A network communication apparatus as recited in claim 24, wherein communications to the provider edge router use external border gateway protocol (EBGP), wherein the provider edge router is outside an autonomous system, and further comprising:
means for removing the cost community attribute;
means for determining an IGP cost of a nexthop associated with the route based at least in part on the cost metric value;
means for normalizing the IGP cost;
means for determining a sum of the normalized IGP cost and the cost metric value; and
means for sending the sum in a multi-exit discriminator (MED) attribute of an EGBP message to EGBP neighbor nodes of the egress provider edge router.

29. A network communication apparatus as recited in claim 24, further comprising:
  means for removing the cost community attribute;
  means for determining an IGP cost of a nexthop associated with the route based at least in part on the cost metric value;
  means for normalizing the IGP cost;
  means for determining a sum of the normalized IGP cost and the cost metric value;
  means for converting the sum to an IGP metric value; and
  means for sending the route announcement message to a second customer edge router using IGP, wherein the route announcement message includes the IGP metric value.

30. A network communication apparatus as recited in claim 24, wherein the egress provider edge router communicates with a second customer edge router using a BGP, wherein the second customer edge router is multihomed, further comprising:
  means for sending a second route announcement message, which includes the total transit cost from the egress provider edge router to the endpoint associated with the originating customer edge router, to the second customer edge router;
  means for at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

31. A network communication apparatus as recited in claim 24, wherein the egress provider edge router communicates with a second customer edge router using a BGP, wherein the second customer edge router is not multihomed, and further comprising:
  means for sending a second route announcement message, which includes the total transit cost from the egress provider edge router to the endpoint associated with the originating customer edge router, to the second customer edge router;
  means for at the second customer edge router, determining a bestpath to the originating customer edge router based on always comparing BGP MED values for a first autonomous system that includes the egress provider edge router and a second autonomous system, different from the first autonomous system, that includes a second provider edge router, and storing the bestpath in a router information base (RIB) of the second customer edge router.

32. A network communication apparatus as recited in claim 31, wherein the egress provider edge router communicates with a second customer edge router using an IGP, wherein the second customer edge router is multihomed, and further comprising:
  means for sending a second route announcement message, which includes the total transit cost from the egress provider edge router to the endpoint associated with the originating customer edge router, to the second customer edge router;
  means for at the second customer edge router, determining a bestpath to the originating customer edge router based on the total transit cost from the egress provider edge router to the endpoint associated with the originating customer edge router, and storing the bestpath in a router information base (RIB) of the second customer edge router.

33. A network communication apparatus as recited in claim 24, wherein the network communication apparatus is coupled within one or more autonomous systems that are owned or operated by one or more Internet Service Providers.

34. A method, comprising:
  receiving first network route information from an originating customer edge router by an ingress provider edge router, wherein the first network route information identifies a first route from the ingress provider edge router to an endpoint associated with the originating customer edge router, wherein the first network route information comprises a first transit cost for the first route;
  sending a route announcement message to an egress provider edge router by the ingress provider edge router, wherein the route announcement message includes the route identified in the first network route information and the first transit cost for the route;
  determining a second transit cost for a second route from the egress provider edge router to the ingress provider edge router;
  adding at least the first transit cost and the second transit cost to determine a total transit cost from the egress provider edge router to the endpoint associated with the originating customer edge router;
  determining, based at least in part upon the total transit cost from the egress provider edge router to the endpoint associated with the originating customer edge, a best path from the egress provider edge router to the endpoint associated with the originating customer edge router.

* * * * *